Figure 1:
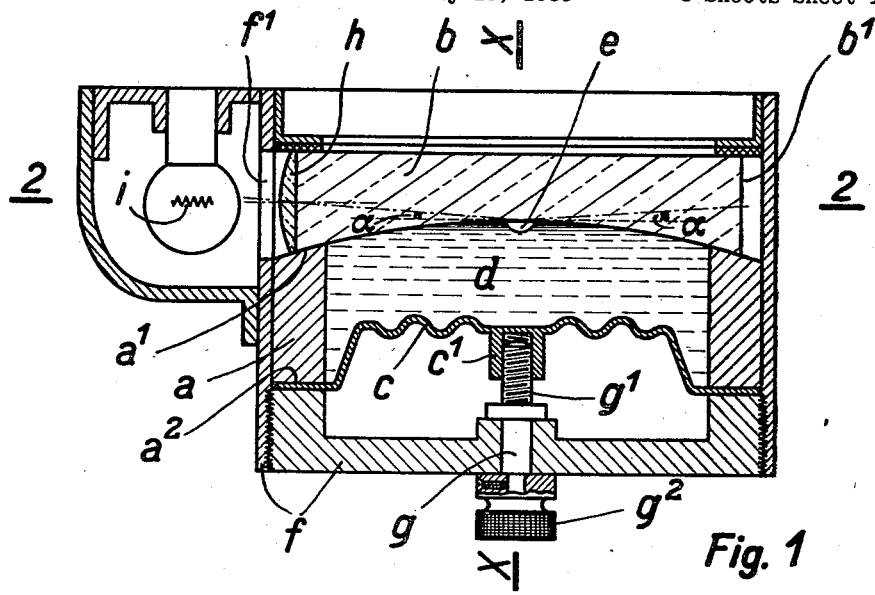

Jan. 13, 1942.    M. DRODOFSKY ET AL    2,270,163
ILLUMINATION DEVICE FOR SPHERICAL LEVELS
Filed July 18, 1939    3 Sheets-Sheet 2

Inventors:
Martin Drodofsky

Patented Jan. 13, 1942

2,270,163

UNITED STATES PATENT OFFICE 2,270,163

ILLUMINATION DEVICE FOR SPHERICAL LEVELS

Martin Drodofsky and Gustav Förstner, Jena, Germany, assignors to the firm of Carl Zeiss, Jena, Germany Application July 18, 1939, Serial No. 285,213
In Germany August 2, 1938

5 Claims. (Cl. 240—6.44)

The invention concerns a device for illuminating the bubble of a spherical level through the cover glass of same for the purpose of producing by reflexion on this bubble pairs of light spots whose individual spots, when looking perpendicular upon the bubble, lie symmetrical to the centre of the bubble no matter what position the bubble may occupy.

The production of light spots in said relative position to the bubble ensures that in instruments as sextants, for instance, where the bubble, during daylight illumination, serves as the setting mark (in that an image of an object point is made to coincide with the centre of the bubble), the said light spots can be used as setting mark during the night-illumination without impairing the reading accuracy, because—due to the said symmetrical position of the two individual spots of a pair of light spots relative to the centre of the bubble—the readily permissible adjustment of the image of an object point to the centre of the line connecting the two individual spots of a pair of light spots is entirely equivalent to the adjustment of the said image to the centre of the bubble.

In accordance with the invention it is possible to produce pairs of light spots of the aforesaid kind by means of an illuminating device which comprises at least one light source and optical members co-operating with said light source and adapted to produce two pencils of parallel light rays, the axes of said two pencils inclining to the axis of the level, oppositely to each other, at equal angles deviating from 90°.

Where the illuminating device contains one single light source only, the illumination of the bubble by two pencils of parallel light rays of the aforesaid position requires that the said optical members contain reflecting means. A simple design of illuminating device is in this case obtained according to the invention if a lens and a reflecting surface is coordinated to the light source and if the light source, lens and reflecting surface occupy the following positions relative to each other and to the level. The light source and the lens are so disposed near the side wall of the cover glass of the level that the light source lies in the focal plane of the lens, and the lens between the light source and the said side wall, whereby the line connecting said light source and the optical centre of said lens intersects the axis of the level and slightly inclines towards said axis. The reflecting surface is located on the side wall of the cover glass and is azimuthally shifted by 180° relative to the lens. The reflecting surface, furthermore, is parallel to the axis of the level and perpendicular to the plane containing the axis of the level and said connecting line.

Simple models of an illuminating device according to the invention also result if the illuminating device consists of two systems each of which contains a light source and a lens disposed between the light source and the cover glass of the level, whereby the light source lies in a focal plane of the lens and furthermore, whereby the line connecting the light source and the optical centre of the lens intersects and inclines towards the axis of the level and whereby the line connecting the light source and the optical centre of the lens of one of those two systems is azimuthally shifted by 180° relative to the line connecting the light source and the optical centre of the lens of the other system and whereby both lines enclose equal angles with the axis of the level.

An illuminating device of such design permits development of two specific types, i. e., there is a possibility of carrying the pencils of the parallel light-rays emanating from the said two systems either through the side wall or through the upper surface of the cover glass of the level. In the first case it is recommendable to assign to the said angles a value of almost 90°, while in the latter case the value of the said angles is recommended to lie below 35°. To effect on the bubble the reflexion of light rays necessary for producing the desired pairs of light spots the refractive indices of the cover glass and of the liquid of the bubble must, as usual, not differ very much from one another in the first case, while in the latter case the question of refractive indices does not matter, although a dark background must be provided for the bubble for which purpose it is expedient to use a dark liquid for the bubble.

Figure 2:
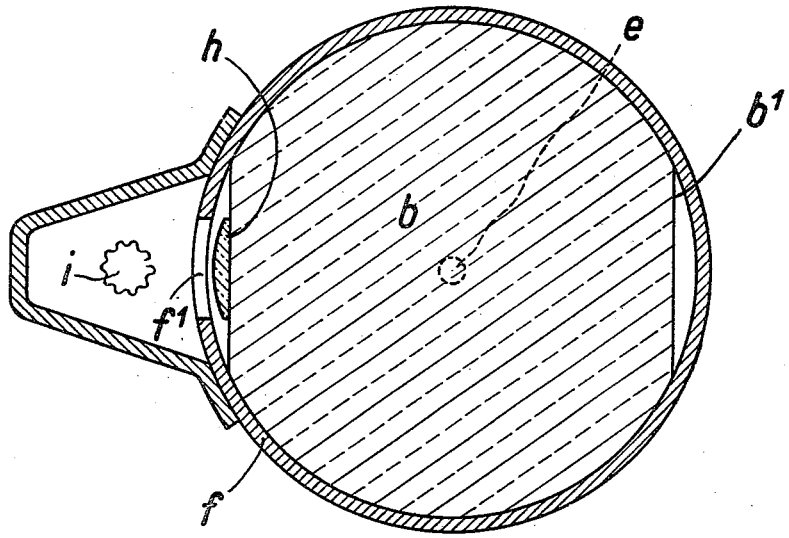

The accompanying drawings, which illustrate the invention, show three constructional examples of an illumination device for spherical levels. In the first two examples, shown by Figures 1 and 3 in sections through the axes of the levels and by Figures 2 and 4 in sections at right angles to the said axes, the levels are illuminated through the side wall of the cover glasses. In the third example, shown by Figure 5 in a section through the axis of the level, the bubble is illuminated through the upper part of the cover glass.

The spherical level according to the first example (Figures 1 and 2) consists of a metal frame $a$ into whose upper surface $a^1$ and lower surface $a^2$ are burnt an easily polishable glazing and a copper layer, respectively. A glass $b$ fast with the surface $a^1$ and a metal diaphragm $c$ soldered to the surface $a^2$ constitute the cover and the bottom, respectively, of the level. The space between the frame $a$, the cover glass $b$ and the bottom $c$ is filled with so much of a liquid $d$ that only a small air bubble $e$ remains. The level is mounted in a housing $f$. A bolt $g$ having a thread $g^1$ in mesh with a fitting $c^1$ fast with the bottom $c$ is rotatable in the housing $f$ about the axis X—X of the level. Rotating the bolt $g$ by means of a milled head $g^2$ entails a displacement of the bottom $c$ and influences, accordingly, the size of the bubble $e$. With a view to illuminating the bubble through the side wall of the cover glass $b$ in such a manner that this bubble receives parallel light rays from two places opposite each other, this side wall has cemented to it a lens $h$ the axis of which intersects the axis X—X of the level at right angles. Opposite the lens $h$, the side wall of the cover glass $b$ has a plane surface $b^1$, which is silvered. Through an aperture $f^1$ in the housing $f$ an incandescent lamp $i$ directs light to the lens $h$ in such a manner that the rays leaving the lens $h$, which are parallel to each other, and a plane at right angles to the axis X—X include an angle $\alpha$. An angle $\alpha$ is included also by the said plane and the rays reflected by the surface $b^1$.

The spherical level according to the second example (Figures 3 and 4) differs from the preceding one only in that its surface $b^1$, instead of being silvered, carries a lens $h^1$ cemented to it, which corresponds exactly to and is coaxial with the lens $h$. The lamp $i^1$ directs light rays through the aperture $f^2$ of the housing $f$ to the lens $h^1$, which makes these rays parallel.

Figure 3:
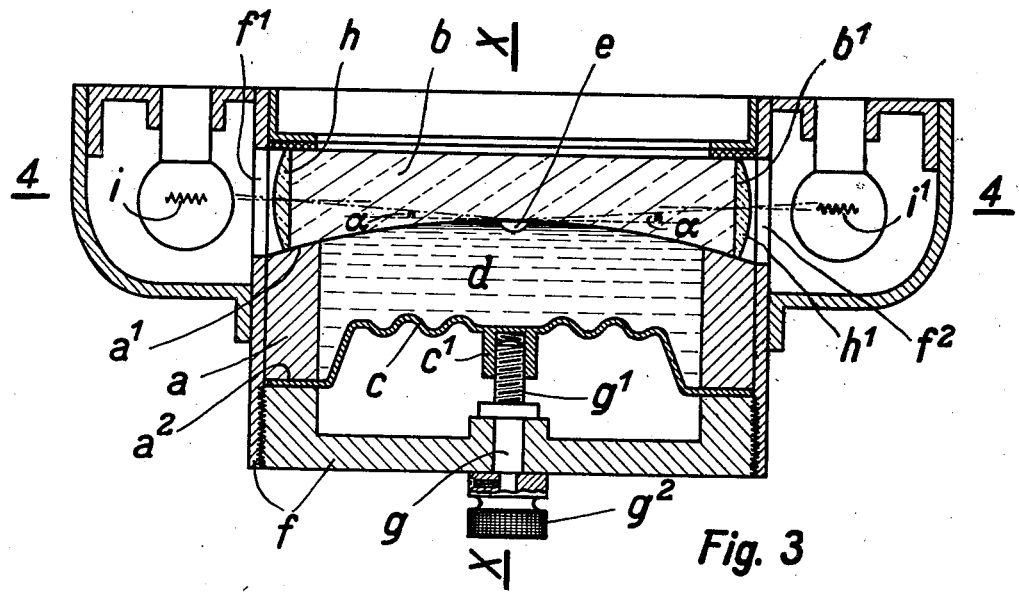
Figure 4:
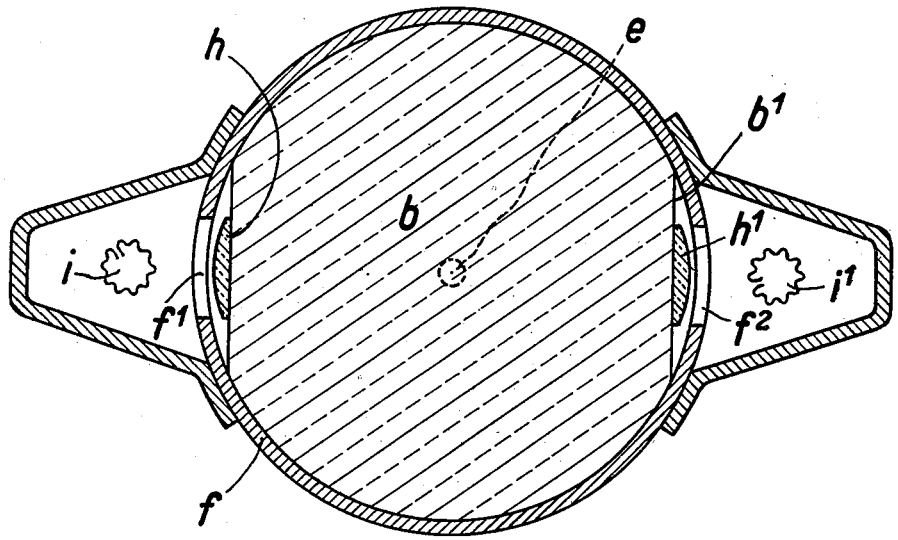
Figure 5:
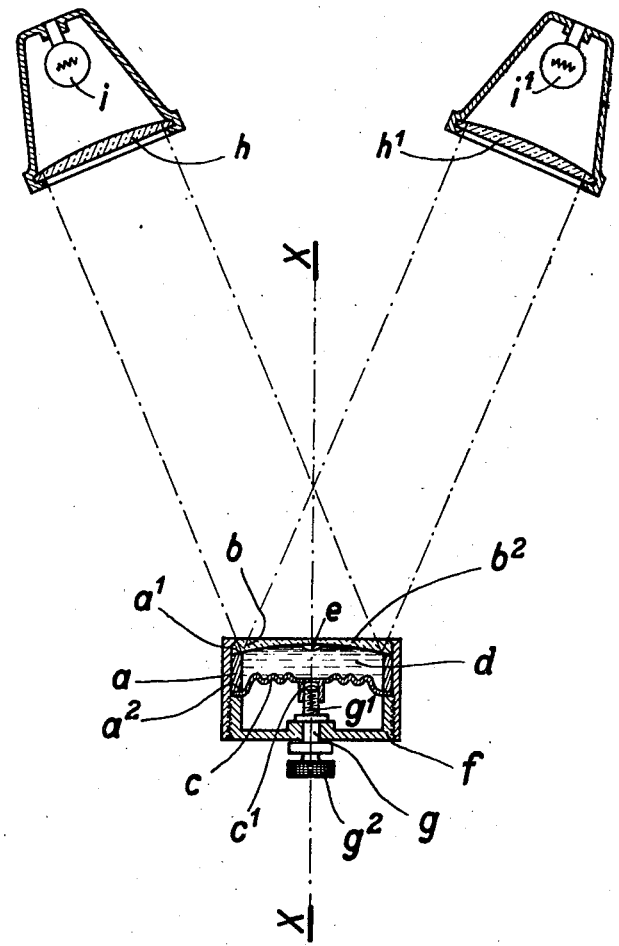

The spherical level according to the third example (Figure 5) differs from that illustrated by Figures 3 and 4 only in that the two illumination devices $i$, $h$ and $i^1$, $h^1$ are so arranged that two pencils of parallel light rays enter the level by way of the upper surface $b^2$ of the cover glass $b$. The liquid $d$ in the level is diluted zapon varnish.

We claim:

1. In a device for illuminating the bubble of a spherical level through the cover glass of same, a light source and a lens disposed between said light source and the side wall of said cover glass, said light source lying sideways of said level in a focal plane of said lens, the line which connects said light source and the optical centre of said lens intersecting the axis of said level and being inclined towards said axis through an angle which is nearly 90°, said side wall having a silvered surface which is azimuthally displaced by 180° relatively to said lens, said surface being parallel to said axis and at right angles to the plane containing said axis and said connecting line.

2. In a device for illuminating the bubble of a spherical level through the cover glass of same, two illuminating systems, each of said two systems comprising a light source and a lens disposed between said light source and said cover glass, said light source lying in a focal plane of said lens, the line which connects said light source and the optical centre of said lens intersecting the axis of said level and being inclined towards said axis, the line connecting the light source and the optical centre of the lens of one of said two systems being azimuthally displaced by 180° relatively to the line connecting the light source and the optical centre of the lens of the other system and enclosing with said axis the same angle as said last line does.

3. In a device for illuminating the bubble of a spherical level through the side wall of the cover glass of said level, two illuminating systems sideways of said cover glass, each of said two systems comprising a light source and a lens disposed between said light source and the side wall of said cover glass, said light source lying in a focal plane of said lens, the line which connects said light source and the optical centre of said lens intersecting the axis of said level and being inclined toward said axis through an angle which is nearly 90°, the line connecting the light source and the optical centre of the lens of one of said two systems being azimuthally displaced by 180° relatively to the line connecting the light source and the optical centre of the lens of the other system and enclosing with said axis the same angle as said last line does.

4. In a device for illuminating the bubble of a spherical level, filled with a dark liquid, through the upper surface of the cover glass of said level, two illuminating systems above and sideways of said cover glass, each of said two systems comprising a light source and a lens disposed between said light source and said cover glass, said light source lying in a focal plane of said lens, the line which connects said light source and the optical centre of said lens intersecting the axis of said level and being inclined towards said axis through an angle which is smaller than 35°, the line connecting the light source and the optical centre of the lens of one of said two systems being azimuthally displaced by 180° relatively to the line connecting the light source and the optical centre of the lens of the other system and enclosing with said axis the same angle as said last line does.

5. Device for illuminating the bubble of a spherical level through the cover glass of same, said device comprising optical members and producing two pencils of parallel light rays striking the bubble from opposite sides and being inclined at equal angles smaller than 90° to the axis of the level, which is perpendicular when the centre of the bubble coincides with it.

MARTIN DRODOFSKY.
GUSTAV FÖRSTNER.